United States Patent
Kuroda et al.

(10) Patent No.: US 10,088,495 B2
(45) Date of Patent: Oct. 2, 2018

(54) CAPACITIVE PHYSICAL QUALITY DETECTION DEVICE

(71) Applicant: Panasonic Intellectual Property Management Co., Ltd., Osaka (JP)

(72) Inventors: Keisuke Kuroda, Fukui (JP); Takeshi Mori, Fukui (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 138 days.

(21) Appl. No.: 15/114,777

(22) PCT Filed: Dec. 25, 2014

(86) PCT No.: PCT/JP2014/006450
§ 371 (c)(1),
(2) Date: Jul. 27, 2016

(87) PCT Pub. No.: WO2015/128922
PCT Pub. Date: Sep. 3, 2015

(65) Prior Publication Data
US 2016/0341760 A1    Nov. 24, 2016

(30) Foreign Application Priority Data
Feb. 27, 2014   (JP) .................. 2014-036319

(51) Int. Cl.
*G01P 15/125* (2006.01)
*G01P 21/00* (2006.01)

(52) U.S. Cl.
CPC ............ *G01P 15/125* (2013.01); *G01P 21/00* (2013.01)

(58) Field of Classification Search
CPC ........ G01P 15/125; G01P 15/18; G01P 15/08; G01P 21/00
See application file for complete search history.

(56) References Cited

U.S. PATENT DOCUMENTS 5,325,065 A * 6/1994 Bennett ................. G01P 15/125
324/661
5,637,798 A    6/1997 Schatz
(Continued)

FOREIGN PATENT DOCUMENTS

JP    5-223844    9/1993
JP    8-211093    8/1996
(Continued)

OTHER PUBLICATIONS

International Search Report of PCT application No. PCT/JP2014/006450 dated Mar. 31, 2015.

*Primary Examiner* — Helen Kwok
(74) *Attorney, Agent, or Firm* — McDermott Will & Emery LLP

(57) ABSTRACT

A capacitive physical quality detection device includes a sensor part, a control circuit, and a CV conversion circuit. The sensor part includes a movable electrode, a first fixed electrode, and a second fixed electrode. The CV conversion circuit is configured to receive a reference voltage and to output a voltage corresponding to a capacitance change. In a first time period, the control circuit applies a first signal to the first fixed electrode, and applies a second signal, which is opposite in phase to the first signal, to the second fixed electrode. In a second time period, the control circuit applies the reference voltage to the first fixed electrode and applies the second signal to the second fixed electrode.

11 Claims, 4 Drawing Sheets

(56) References Cited

U.S. PATENT DOCUMENTS

| | | | | |
|---|---|---|---|---|
| 5,977,803 A * | 11/1999 | Tsugai | ............... | G01R 27/2605 |
| | | | | 327/337 |
| 6,023,960 A | 2/2000 | Abrams et al. | | |
| 6,257,061 B1 | 7/2001 | Nonoyama et al. | | |
| 6,483,322 B2 * | 11/2002 | Aoyama | ............... | G01P 15/125 |
| | | | | 324/661 |
| 6,668,614 B2 * | 12/2003 | Itakura | ................ | G01D 5/2417 |
| | | | | 324/661 |
| 6,997,054 B2 * | 2/2006 | Tsugai | ............... | G01C 19/5719 |
| | | | | 73/504.12 |
| 7,109,727 B2 * | 9/2006 | Hayakawa | ............ | G01P 15/125 |
| | | | | 324/679 |
| 7,168,320 B2 * | 1/2007 | Murata | ................ | G01P 15/125 |
| | | | | 73/514.32 |
| 7,432,724 B2 * | 10/2008 | Goto | ................ | G01R 27/2605 |
| | | | | 324/658 |
| 7,525,322 B2 * | 4/2009 | Hattori | ............... | B81C 99/0035 |
| | | | | 324/658 |
| 7,622,781 B2 * | 11/2009 | Sakai | .................... | G01P 15/125 |
| | | | | 257/415 |
| 7,628,073 B2 * | 12/2009 | Aoyama | ............... | G01P 15/125 |
| | | | | 73/1.38 |
| 7,795,881 B2 * | 9/2010 | Masuda | ................ | G01P 15/125 |
| | | | | 324/661 |
| 8,547,119 B2 * | 10/2013 | Ikuta | ........................ | G01D 5/24 |
| | | | | 324/548 |
| 2009/0095080 A1 | 4/2009 | Sasaki et al. | | |

FOREIGN PATENT DOCUMENTS

| | | |
|---|---|---|
| JP | 2000-081449 | 3/2000 |
| JP | 2009-097932 | 5/2009 |

* cited by examiner

CAPACITIVE PHYSICAL QUALITY DETECTION DEVICE

This application is a U.S. national stage application of the PCT international application No. PCT/JP2014/006450.

TECHNICAL FIELD

The present disclosure relates to a capacitive physical quality detection device that detects a physical quantity such as acceleration, angular velocity, or pressure.

BACKGROUND ART

FIG. 4 is a schematic view of conventional capacitive physical quality detection device 100. Device 100 includes movable electrode 102 that is displaced by acceleration, and fixed electrodes 103 facing movable electrode 102. Device 100 detects the displacement of movable electrode 102 due to acceleration as a capacitance change between movable electrode 102 and fixed electrodes 103 so as to detect acceleration. More specifically, electrostatic force generation means 104 displaces movable electrode 102, whereas capacitive detection means 105 detects the capacitance change between movable electrode 102 and fixed electrodes 103 due to the displacement. Capacitive detection means 105 determines whether the capacitance change exceeds a predetermined threshold, thereby performing fault diagnosis such as whether the movable electrode is functioning normally or whether the signal path to the capacitive detection means is in a disconnected state. An example of conventional techniques related to the present application is Patent Literature 1.

CITATION LIST

Patent Literature

PTL: Japanese Unexamined Patent Application Publication No. H05-223844

SUMMARY OF THE INVENTION

It is an object of the present disclosure is to provide a capacitive physical quality detection device including a sensor part, a control circuit, and a CV conversion circuit.

The sensor part includes a movable electrode, a first fixed electrode, and a second fixed electrode. The movable electrode is configured to be displaced by changing of physical quantity. The first fixed electrode is disposed to face a first portion of the movable electrode, and the second fixed electrode is disposed to face a second portion of the movable electrode.

The control circuit is configured to apply a signal between the movable electrode and the first fixed electrode, and between the movable electrode and the second fixed electrode.

The CV conversion circuit is configured to receive a reference voltage and to output a voltage corresponding to a capacitance change between the movable electrode and the first fixed electrode, and between the movable electrode and the second fixed electrode.

In a first time period, the control circuit applies a first signal to the first fixed electrode, and applies a second signal, which is opposite in phase to the first signal, to the second fixed electrode. In a second time period, the control circuit applies the reference voltage to the first fixed electrode, and applies the second signal to the second fixed electrode.

DESCRIPTION OF EMBODIMENT

According to conventional capacitive physical quality detection device 100, fault diagnosis often takes time because it requires movable electrode 102 to be displaced. Furthermore, if fault diagnosis is performed without displacing movable electrode 102 when the signal path to capacitive detection means 105 is in a disconnected state, the capacitive detection means detects a signal of zero. This cannot be distinguished from the case where the input physical quantity is zero when the signal path is in the normal state, making it impossible to detect faults.

Exemplary Embodiment

An acceleration sensor as an example of the capacitive physical quality detection device according to the present disclosure will now be described with reference to accompanying drawings.

Figure 1:
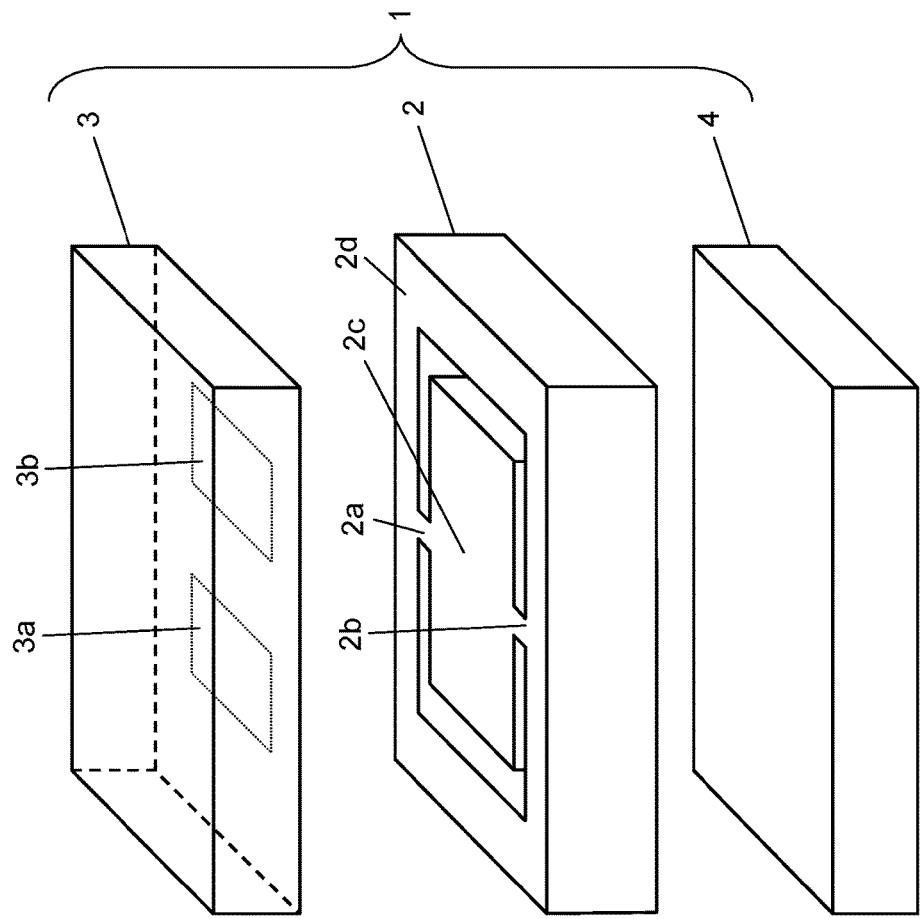
FIG. 1 is a perspective view of a sensor part of an acceleration sensor according to the present embodiment.
Figure 2:
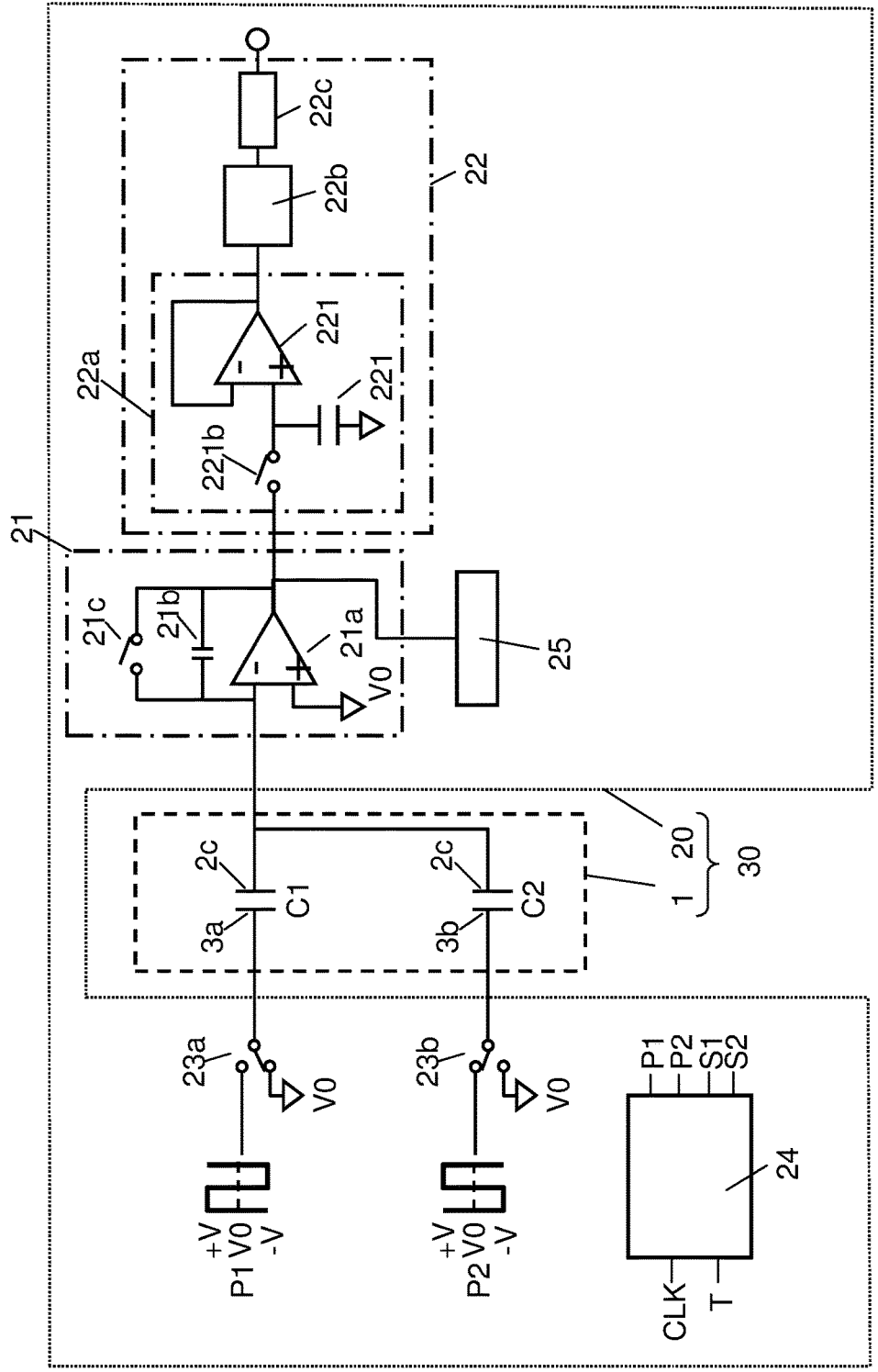
FIG. 2 is a circuit diagram of the acceleration sensor according to the present embodiment.

FIG. 1 is a perspective view of sensor part 1 of acceleration sensor 30 according to the present embodiment. FIG. 2 is a circuit diagram of acceleration sensor 30.

The capacitive physical quality detection device includes sensor part 1, control circuit 24, and CV conversion circuit 21.

Sensor part 1 includes movable electrode 2c, first fixed electrode 3a, and second fixed electrode 3b. Movable electrode 2c is displaced by changing of physical quantity. First fixed electrode 3a is disposed to face a first portion of movable electrode 2c, and second fixed electrode 3b is disposed to face a second portion of movable electrode 2c.

Control circuit 24 applies a signal between movable electrode 2c and first fixed electrode 3a, and also between movable electrode 2c and second fixed electrode 3b.

CV conversion circuit 21 receives a reference voltage, and in turn outputs a voltage corresponding to a capacitance change between movable electrode 2c and first fixed electrode 3a, and also between movable electrode 2c and second fixed electrode 3b.

In a first time period, control circuit 24 applies a first signal P1 to first fixed electrode 3a, and applies a second signal P2, which is opposite in phase to the first signal, to second fixed electrode 3b. In a second time period, control circuit 24 applies the reference voltage to first fixed electrode 3a, and applies the second signal P2 to second fixed electrode 3b.

Acceleration sensor 30 will be described in detail as follows. Sensor part 1 includes acceleration sensor element 2, top lid 3, and bottom lid 4. Acceleration sensor element 2 is held between top lid 3 and bottom lid 4, and includes beam 2a, beam 2b, movable electrode 2c, and frame 2d. Top lid 3 is provided with fixed electrode 3a (first fixed electrode) and fixed electrode 3b (second fixed electrode). Fixed electrode 3a is disposed to face the first portion of movable electrode 2c, and fixed electrode 3b is disposed to face the second portion of movable electrode 2c.

Movable electrode 2c and fixed electrode 3a form a capacitance, whereas movable electrode 2c and fixed electrode 3b form a capacitance. When movable electrode 2c is displaced by acceleration, these capacitances change with the displacement of movable electrode 2c. After-mentioned detection circuit 20 detects acceleration based on a differential capacitance change between movable electrode 2c and fixed electrode 3a, and also between movable electrode 2c and fixed electrode 3b.

Acceleration sensor 30 includes sensor part 1 and detection circuit 20. Detection circuit 20 includes CV conversion circuit 21, signal processing circuit 22, control circuit 24, and decision circuit 25. Control circuit 24 is a signal applying means for periodically applying a signal between movable electrode 2c and fixed electrodes 3a, 3b.

CV conversion circuit 21 includes amplifier 21a, capacitor 21b, and switch 21c. Circuit 21 converts the differential capacitance change between movable electrode 2c and each of fixed electrodes 3a and 3b to a voltage. Amplifier 21a has an inverting input terminal (first input terminal), which is connected to movable electrode 2c. Capacitor 21b and switch 21c are connected in parallel between the inverting input terminal and the output terminal of amplifier 21a. Amplifier 21a has a non-inverting input terminal (second input terminal), which receives a reference voltage V0. In the following description, the reference voltage V0 is set to 0 V for simplification.

Signal processing circuit 22 includes sample-and-hold circuit 22a, amplifier circuit 22b, and lowpass filter 22c. Sample-and-hold circuit 22a samples (measures) the output voltage of CV conversion circuit 21 and holds it for a certain period. Amplifier circuit 22b amplifies the output voltage of sample-and-hold circuit 22a so that the voltage has a predetermined sensitivity. Lowpass filter 22c extracts only predetermined frequency band components from the output voltage of amplifier circuit 22b, and outputs an acceleration detection signal.

Control circuit 24 generates carrier signals P1, P2 and switching signals S1, S2 based on a reference clock CLK and a fault diagnostic signal T, and outputs these signals. The carrier signal P1 (first signal) has an amplitude of ±V and is applied to fixed electrode 3a. The carrier signal P2 (second signal) has an amplitude of ±V and is applied to fixed electrode 3b. The switching signal S1 opens or closes switch 21c. The switching signal S2 opens or closes switch 221b. Switches 21c and 221b are semiconductor switches and are in the closed state when the switching signal from control circuit 24 is high.

Figure 3:
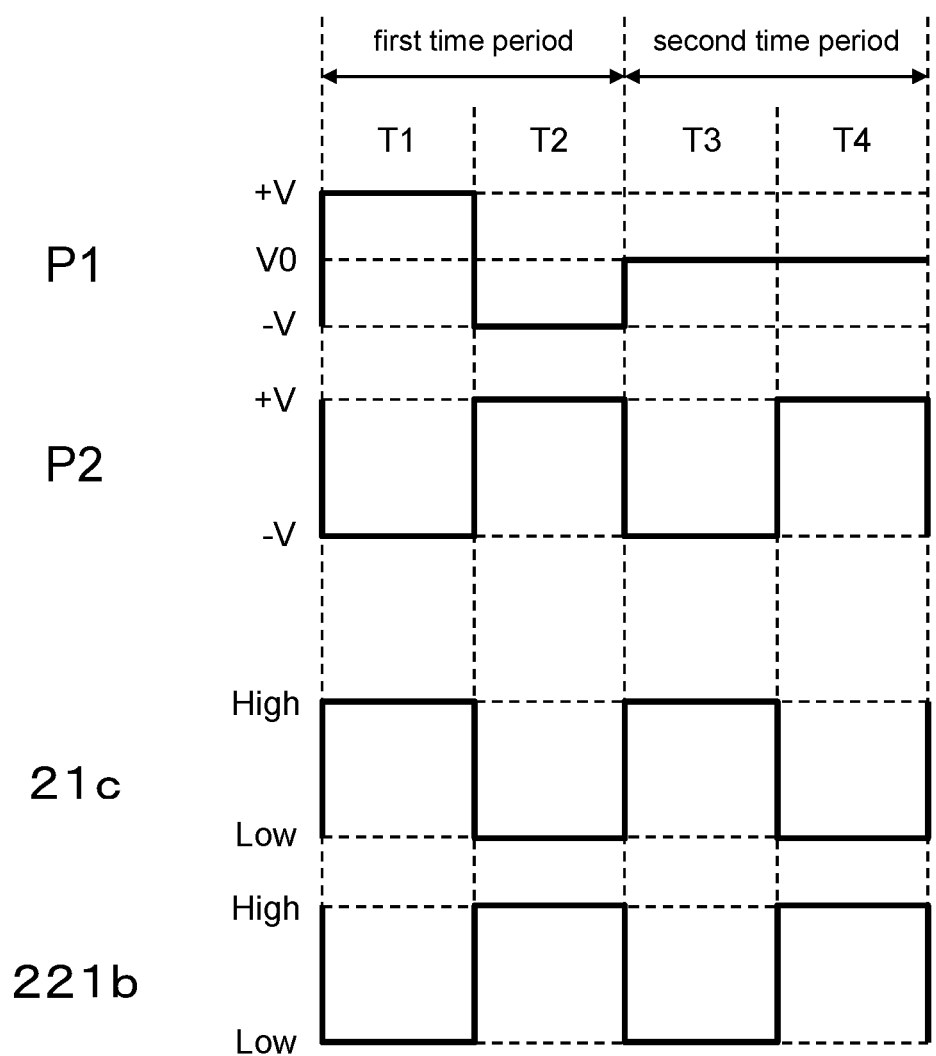
FIG. 3 is a diagram showing the relationship between the waveforms of carrier signals and the opening and closing timings of switches in the acceleration sensor according to the present embodiment.
Figure 4:
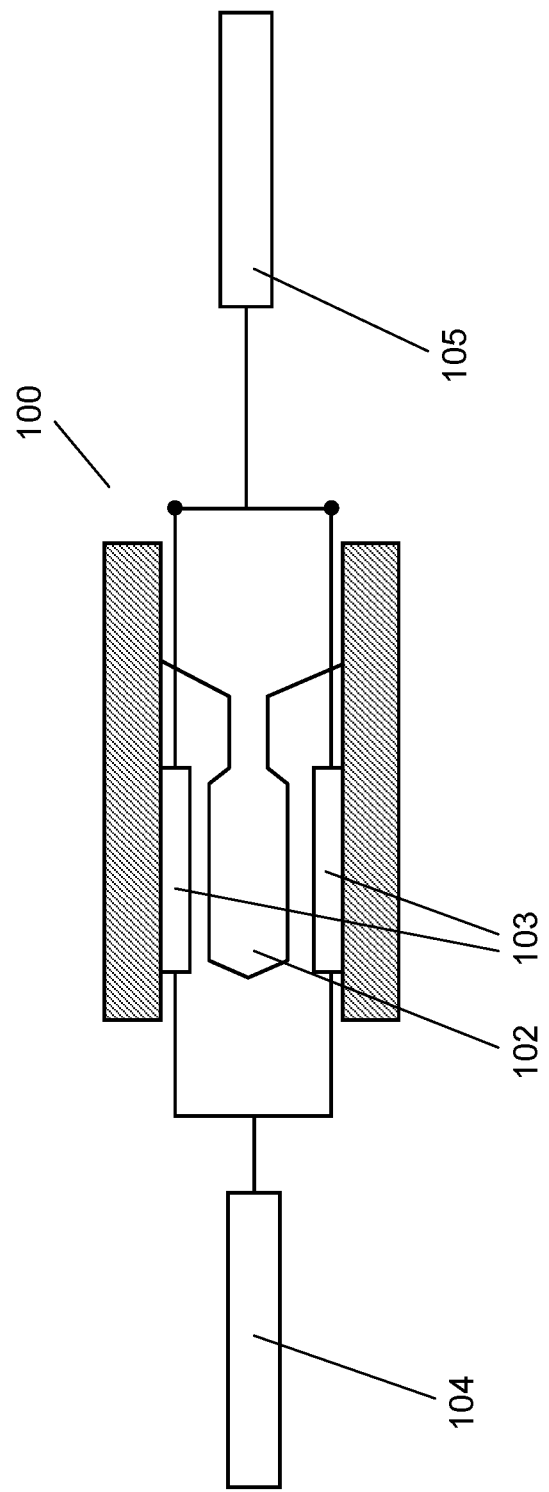
FIG. 4 is a schematic view of a conventional capacitive physical quality detection device.

The operation of the acceleration sensor will now be described with reference to FIG. 3. FIG. 3 is a diagram showing the relationship between the waveforms of carrier signals and the opening and closing timings of switches in acceleration sensor 30 according to the present embodiment. The symbol "P1" represents the carrier signal P1, which is applied to fixed electrode 3a, and the symbol "P2" represents the carrier signal P2, which is applied to fixed electrode 3b. The symbol "21c" represents the opening and closing timings of switch 21c, and the symbol "221b" represents the opening and closing timings of switch 221b.

In a first time period consisting of T1 and T2, the capacitance change with the input physical quantity is measured (normal operation). In a second time period consisting of T3 and T4, it is determined whether the signal path to the capacitive detection means is in a disconnected state (fault diagnosis). This enables performing fault diagnosis without displacing the movable electrode, thereby reducing the time required for fault diagnosis.

Control circuit 24 outputs the carrier signals P1 and P2. As shown in FIG. 3, the carrier signal P1 is a rectangular signal with constant amplitude changing from high (+V) to low (−V) or vice versa in T1 and T2 of the first time period. The carrier signal P2 has an opposite voltage level to the carrier signal P1 in T1 and T2 of the first time period.

The measurement of the capacitance change during the normal operation will now be described with reference to FIG. 3. In FIG. 3, the symbol "P1" represents a voltage signal applied to fixed electrode 3a, and the symbol "P2" represents a voltage signal applied to fixed electrode 3b.

In T1 of the first time period, the carrier signal P1 is at +V, and the carrier signal P2 is at −V. Meanwhile, switch 21c is in the closed state (high), and switch 221b is in the open state (low) due to the switching signals S1 and S2 from control circuit 24. As a result, a voltage of V0 is applied to each of the non-inverting input terminal of amplifier 21a and movable electrode 2c, whereas the charge of capacitor 21b is discharged. In the measurement during the normal operation, switch 23a and switch 23b are not connected to reference voltage V0 and are connected in such a manner as to apply the carrier waves P1 and P2 to movable electrode 2c.

In this situation, a charge of $Q1=-C1 \cdot V$ builds up between movable electrode 2c and fixed electrode 3a. The minus sign indicates that negative charge builds up on the surface portion of movable electrode 2c that opposes fixed electrode 3a. Meanwhile, a charge of $Q2=+C2 \cdot V$ builds up between movable electrode 2c and fixed electrode 3b. The plus sign indicates that positive charge builds up on the surface portion of movable electrode 2c that opposes fixed electrode 3b. The total amount of charge on movable electrode 2c is the sum of Q1 and Q2, that is, $Q1+Q2=(C2-C1) \cdot V$.

In T2 of the first time period, the voltage levels of the carrier signals P1 and P2 are reversed, so that P1 is at −V and P2 is at +V. As a result, switch 21c is opened, and switch 221b is closed.

In this situation, a charge of $Q1'=+C1 \cdot V$ builds up between movable electrode 2c and fixed electrode 3a, and a charge of $Q2'=-C2 \cdot V$ builds up between movable electrode 2c and fixed electrode 3b. The total amount of charge on movable electrode 2c is the sum of Q1' and Q2', that is, $Q1'+Q2'=(C1-C2) \cdot V$.

The difference ΔQ between the charge (Q1+Q2) built up on movable electrode 2c in T1 and the charge (Q1'+Q2') built up on movable electrode 2c in T2 is as follows: $\Delta Q=(Q1+Q2)-(Q1'+Q2')=-(C1-C2) \cdot 2V$.

Here if the differential capacitances C1 and C2 are different from each other, the charge ΔQ builds up on movable electrode 2c, but the voltage of movable electrode 2c is kept at V0 by amplifier 21a. Consequently, the charge ΔQ charge builds up on the electrode of capacitor 21b that is on the movable electrode 2c side, whereas the opposite charge $\Delta Q'=(C1-C2) \cdot 2V$ builds up on the other electrode of capacitor 21b. As a result, assuming that capacitor 21b has a capacitance Cf, the output terminal of amplifier 21a has a voltage of $\Delta Q'/Cf=(C1-C2) \cdot 2V/Cf$ and outputs a voltage corresponding to the difference in capacitance (C1−C2).

This voltage is sampled and held by sample-and-hold circuit 22a and is outputted as an acceleration detection signal through amplifier circuit 22b and lowpass filter 22c. More specifically, sample-and-hold circuit 22a samples (measures) the output voltage of amplifier 21*a* in T2, and holds the sampled voltage during the other time periods. The output voltage of sample-and-hold circuit 22*a* allows outputting the acceleration detection signal through amplifier circuit 22*b* and lowpass filter 22*c*.

The operation in fault diagnosis will now be described with reference to FIG. 3.

During fault diagnosis, in T3 and T4 of the second time period, one of switches 23*a* and 23*b* is switched to be connected to the reference voltage V0.

The following shows the case in which switch 23*a* is connected to the reference voltage V0. In T3 of the second time period, both movable electrode 2*c* and fixed electrode 3*a* have a potential of V0. Since the potential difference is zero, the charge Q1 is also zero. Meanwhile, a charge of Q2=+C2·V builds up between movable electrode 2*c* and fixed electrode 3*b* in the same manner as in T1 of the first time period. As a result, the total amount of charge on movable electrode 2*c* is as follows: Q1+Q2=0+C2·V=C2·V.

In T4 of the second time period, the charge Q1' is zero, which is the same as in T3 of the second time period. The charge Q2' is Q2'=−C2·V, which is the same as in T2 of the first time period. As the result, the total amount of charge on movable electrode 2*c* is as follows: Q1'+Q2'=0−C2·V=−C2·V.

The difference ΔQ between the charge (Q1+Q2) built up on movable electrode 2*c* in T3 and the charge (Q1'+Q2') built up on movable electrode 2*c* in T4 is as follows: ΔQ=(Q1+Q2)−(Q1'+Q2')=C2·2V. As a result, the output terminal of amplifier 21*a* has a voltage of −ΔQ/Cf=−C2·2V/Cf.

When the signal path is in the normal state, the output voltage of CV conversion circuit 21 is −C2·2V/Cf. On the other hand, when the signal path is in a disconnected state, the output voltage of CV conversion circuit 21 is zero. Therefore, decision circuit 25 can determine whether the output voltage of CV conversion circuit 21 exceeds a predetermined threshold so as to determine whether the signal path is in a disconnected state. In the present structure, C2 does not become zero even when the acceleration applied to sensor part 1 is zero. This allows determining whether CV conversion circuit 21 has an output voltage (−C2·2V/Cf), indicating it is in the normal state, or has an output voltage (0), indicating that it is in a disconnected state.

During fault diagnosis, in T3 and T4 of the second time period, sample-and-hold circuit 22*a* holds the voltage that was sampled (measured) in T2 of the first time period. Therefore, variations in the output voltage of CV conversion circuit 21 during the fault diagnosis do not affect the value of acceleration measured by acceleration sensor 30. The sampling period of sample-and-hold circuit 22*a* or the update period of data outputted from acceleration sensor 30 can be set longer than the total of T1, T2 of the first time period and T3, T4 of the second time period. This prevents the acceleration detection operation from being interrupted during fault diagnosis, so that the acceleration detection signal can be provided continuously. In other words, there is no need to waste time for fault diagnosis.

The capacitive physical quality detection device of the present disclosure performs normal operation of measuring the capacitance change with the input physical quantity in T1 and T2 of the first time period, and performs fault diagnosis of determining whether the signal path to the capacitive detection means is in a disconnected state in T3 and T4 of the second time period. This enables performing fault diagnosis without displacing the movable electrode, thereby reducing the time required for fault diagnosis.

INDUSTRIAL APPLICABILITY

The capacitive physical quality detection device according to the present disclosure is useful as an acceleration sensor for vehicle control.

The invention claimed is:

1. A capacitive physical quality detection device comprising:
   a sensor part including:
      a movable electrode configured to be displaced by changing of a physical quantity;
      a first fixed electrode disposed to face a first portion of the movable electrode; and
      a second fixed electrode disposed to face a second portion of the movable electrode;
      a control circuit configured to apply a signal between the movable electrode and the first fixed electrode, and between the movable electrode and the second fixed electrode; and
      a CV conversion circuit configured to receive a reference voltage and to output a voltage corresponding to a capacitance change between the movable electrode and the first fixed electrode, and between the movable electrode and the second fixed electrode,
   wherein:
   in a first time period, the control circuit applies a first signal to the first fixed electrode and applies a second signal to the second fixed electrode, the second signal being opposite in phase to the first signal,
   in a second time period, the control circuit applies the reference voltage to the first fixed electrode and applies the second signal to the second fixed electrode, and
   an amplitude of the second signal in the first time period is the same as an amplitude of the second signal in the second time period.

2. The capacitive physical quality detection device of claim 1, wherein the CV conversion circuit includes an amplifier having a first input terminal connected to the movable electrode.

3. The capacitive physical quality detection device of claim 2, wherein the amplifier has a second input terminal to which the reference voltage is applied.

4. The capacitive physical quality detection device of claim 1, further comprising a sample-and-hold circuit connected to the CV conversion circuit, the sample-and-hold circuit having a sampling period longer than a sum of the first time period and the second time period.

5. The capacitive physical quality detection device of claim 1, wherein the capacitive physical quality detection device has a data update period longer than a sum of the first time period and the second time period.

6. The capacitive physical quality detection device of claim 2, further comprising a switch and a capacitor connected in parallel between the first input terminal and an output terminal of the amplifier.

7. The capacitive physical quality detection device of claim 1, wherein the physical quantity is acceleration.

8. The capacitive physical quality detection device of claim 1, wherein the reference voltage is a constant voltage during the second time period.

9. The capacitive physical quality detection device of claim 1, wherein the first portion of the movable electrode and the second portion of the movable electrode have upper surfaces which are formed in a same planar surface.

10. The capacitive physical quality detection device of claim 9, wherein both the first fixed electrode and the second fixed electrode face the same planar surface of the movable electrode.

11. The capacitive physical quality detection device of claim 1, wherein the amplitude of the second signal transitions between a low voltage and a high voltage in the first time period, and the amplitude of the second signal transitions between the low voltage and the high voltage in the second time period.

* * * * *